United States Patent [19]
O'Brien

[11] 4,058,742
[45] Nov. 15, 1977

[54] RADIO FREQUENCY PULSE TRANSMITTERS

[75] Inventor: William Joseph O'Brien, London, England

[73] Assignee: Decca Record Company Ltd., London, England

[21] Appl. No.: 706,271

[22] Filed: July 19, 1976

Related U.S. Application Data

[63] Continuation of Ser. No. 502,944, Sept. 4, 1974, abandoned.

[51] Int. Cl.$^2$ .................... H03K 1/16; H03K 17/72; H03K 3/02
[52] U.S. Cl. .................... 307/260; 307/252 K; 328/65; 328/67; 325/141
[58] Field of Search .......... 307/252 J, 252 T, 252 W, 307/252 K, 260, 268, 269; 328/62, 63, 65, 67, 71, 55, 57; 325/141; 336/170, 178, 180, 182

[56] References Cited

U.S. PATENT DOCUMENTS

| 3,590,279 | 6/1971 | Thompson et al. | 328/67 X |
| 3,774,054 | 11/1973 | Morse | 328/67 X |

Primary Examiner—John Zazworsky
Attorney, Agent, or Firm—Edward F. Connors

[57] ABSTRACT

In a high power transmitter, more particularly a pulsed transmitter for a phase comparison navigation system, a plurality of solid state current control units are connected to respective separate sections of a primary inductance unit, these sections together forming a primary coupled to a secondary winding in the antenna circuit. The solid state control units may for example be switching units for timed switching of previously charged capacitors into resonant circuits. Switch controlled damping means may be provided for the tank circuits and antenna circuit in a pulse transmitter. Coil constructions are described permitting of the use of a large number of primary coil sections with separate current control units.

33 Claims, 35 Drawing Figures

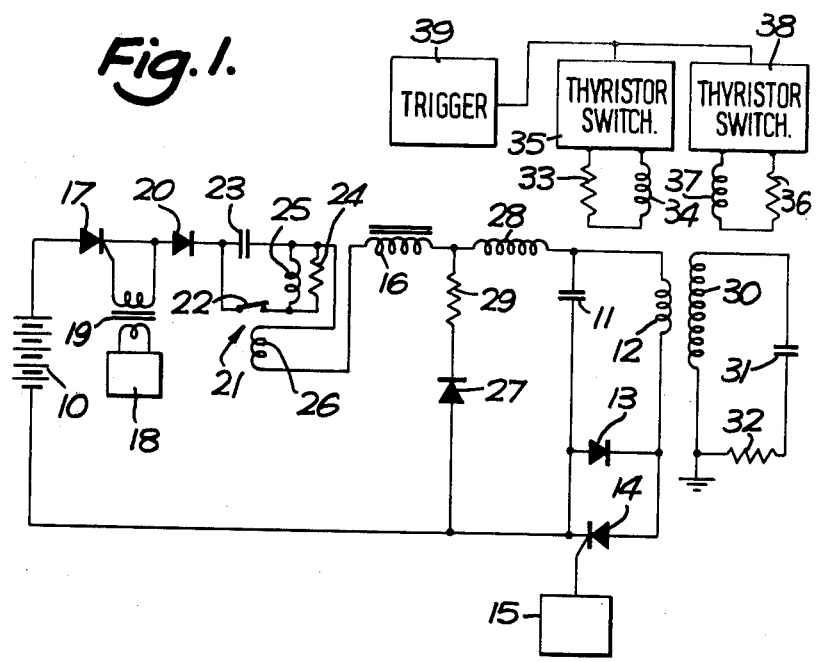
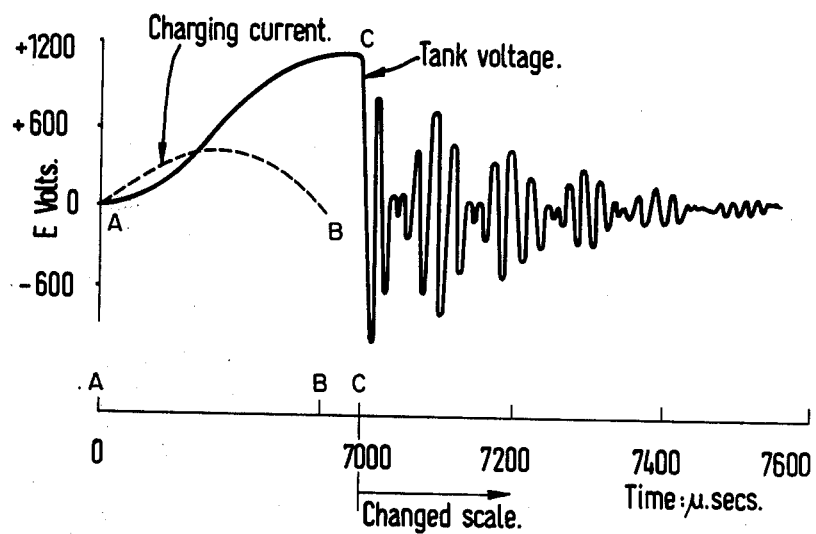

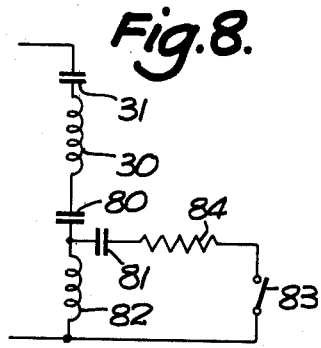
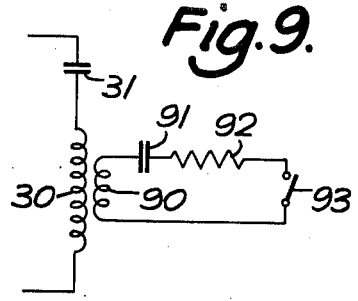
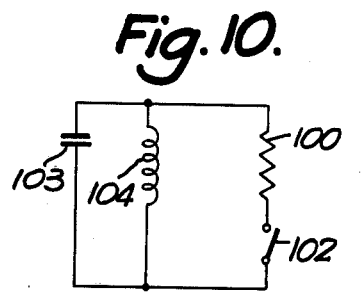
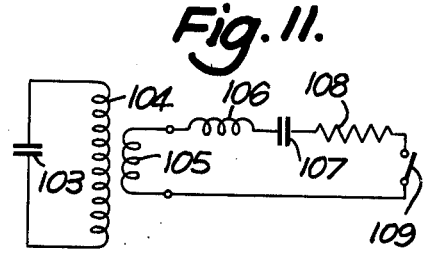
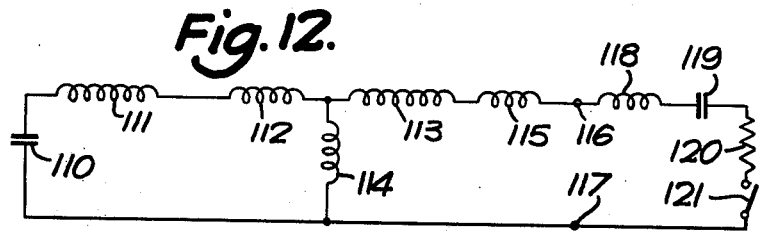
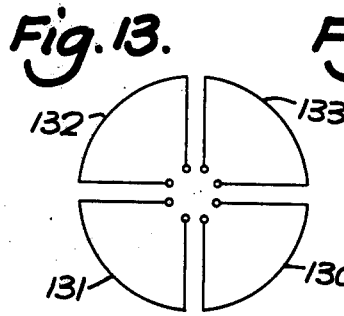
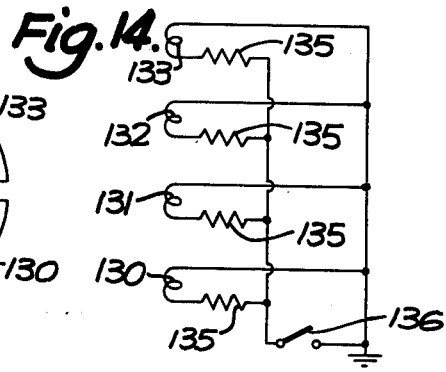

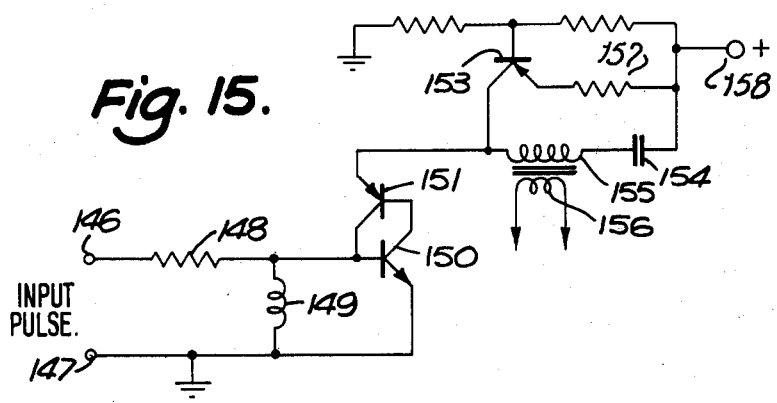
Fig. 15.
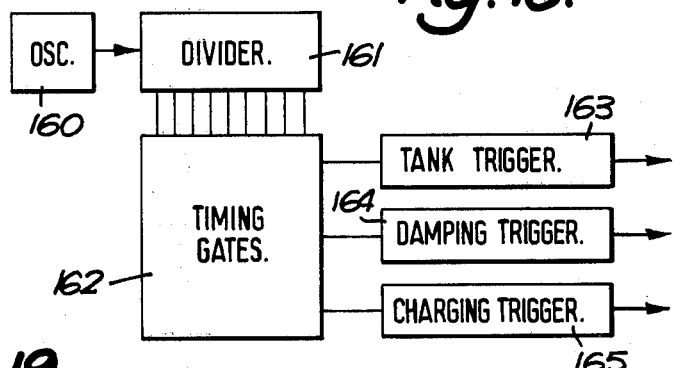
Fig. 16.
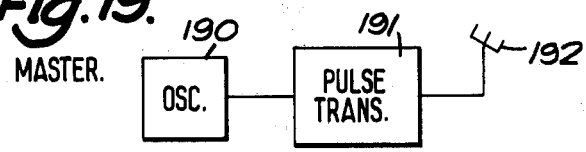
Fig. 19. MASTER.
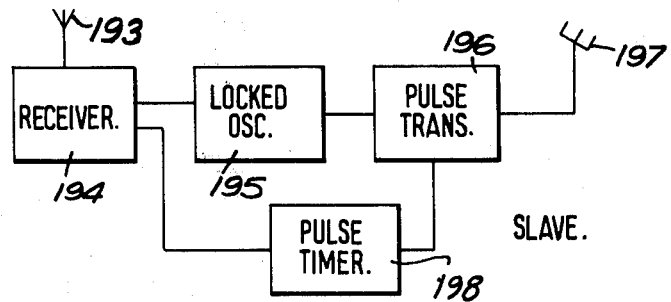
SLAVE.

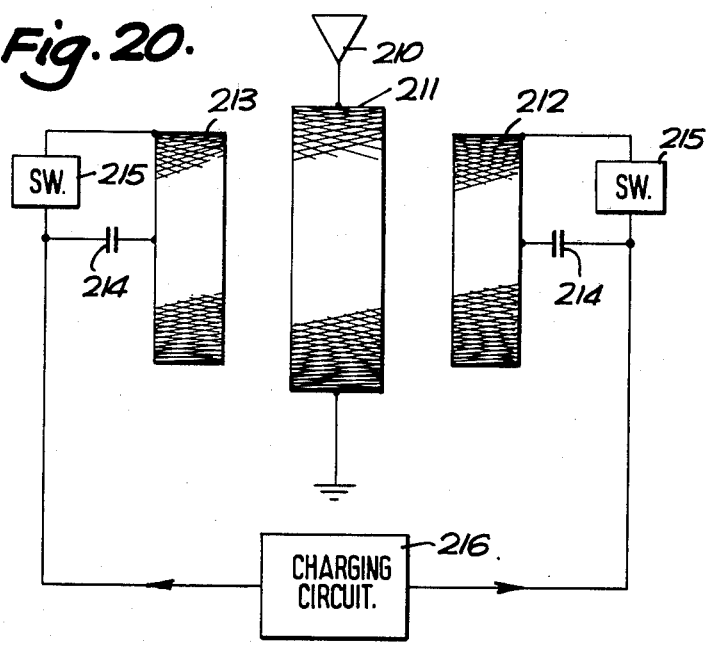
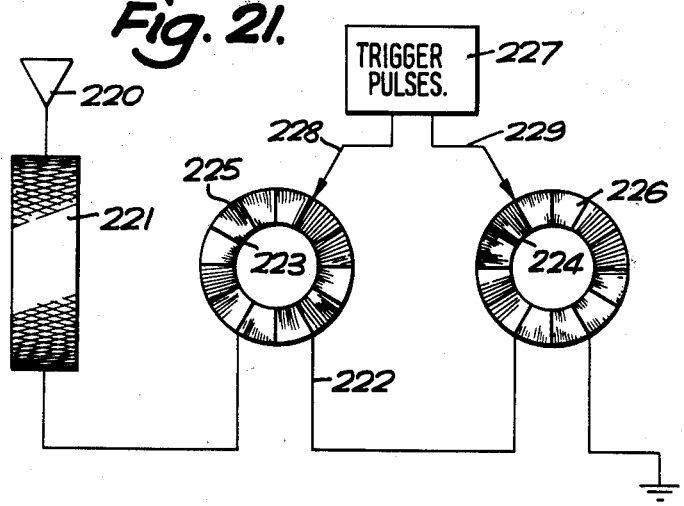

RADIO FREQUENCY PULSE TRANSMITTERS

This is a continuation, of application Ser. No. 502,944 filed Sept. 4, 1974 and now abandoned.

BACKGROUND OF THE INVENTION

This invention relates to radio frequency transmitters and to power output devices for use therein.

Particularly in radio navigation systems, the phase of the radiated signal has to be controlled accurately. If solid state technology is to be used in high power transmitters, it is necessary to use a large number of drive circuits and, considered from one of its aspects, the present invention is directed to an improved form of power output device enabling a large number of solid state current control units to be used to provide a high voltage, high power radio frequency output.

The invention finds particular application in the transmission of pulses of radio frequency in such a manner that an individual cycle in a pulse can be identified. Such pulse signals are required, for example, in the radio navigation system known as Loran C, in which radio frequency transmissions are made from a number of spaced transmitters in sequence. The transmissions each consist of short duration pulses of radio frequency energy with a predetermined waveform and with the radio frequency cycles within the pulses from the different stations held in a fixed phase relationship. Coarse positional information may thus be obtained by determining, at a receiver, the time differences between received pulses but it is also possible to obtain more accurate positional information by determining the phase relationship between the radio frequency signals from spaced stations.

SUMMARY OF THE INVENTION

It is thus a further object of the present invention to provide a form of transmitting equipment for such pulse transmissions which can be made quite simply and can be of low cost compared with equipment used heretofore.

More generally however, the invention is applicable to transmitters for continuous wave as well as pulse transmissions.

According to one aspect of this invention, a radio frequency power output device comprises a coil forming a primary inductance unit and including a plurality of adjacent windings symmetrically constructed and disposed physically to form a single primary inductance unit having negligible external field, a plurality of solid state current control units each directly connected to a respective associated winding, the current control units being located adjacent the respective windings but outside the field of the primary inductance, capacitor means arranged to make each of said adjacent windings resonant at the same predetermined frequency, and a radio frequency power output circuit including a secondary winding coupled to said primary inductance circuit.

The simplest ways of forming a coil with negligible external field are to use a toroidal construction or to provide a conductive shield. Use of such a construction enables the solid state units to be put closely adjacent their respective windings with short connecting leads. In a high power transmitter, the solid state devices must be outside the high flux field if they are to operate reliably and without breakdown; thyristors, for example, may be triggered by a strong field. The above-described arrangement permits of the use of short leads thereby avoiding the phase shift problems which would otherwise arise in energising windings from independent excitation sources.

Considering a toroidal arrangement, a single primary winding of a conventional toroidal transformer can be divided into a number of segments which can be separately energised by their respective solid state control units. The voltage on each segment, for a given flux, is proportional to the area of the segment multiplied by the number of turns in the segment. Thus, for a given voltage on the output circuit, a primary coil comprising one complete turn would have to have $n$ times the voltage of separate segments for a coil having $n$ separate segments. There is a practical limit to the voltages which can be used on solid state devices. However, as will be apparent from the following description, with the arrangement of the present invention, the primary inductance unit may have, for example, many hundreds of separate windings each with its associated solid state control unit and thus it is now readily possible to obtain voltages as high as may be desired on the output circuit.

In a toroidal arrangement, the solid state units may be connected by radial wires to the windings. By using close parallel pairs of wires for radials in which each pair of radial wires has equal currents in opposite directions, the net effective current of a pair of adjacent radials is zero in considering the flux produced by the windings. These parallel lead radials provide a means enabling a voltage tap to be made to a single turn coil without altering the equivalent circuit. The radials may extend inwardly or outwardly. If they extend outwardly, the equivalent of a second outer single turn coil is formed. A close short circuit outer coil will reduce the inductance of that outer turn to substantially zero. By using a number of coil sections in this way, the limitations of the power rating of solid state current control units such as transistors or thyristors can be overcome.

In the simplest case one might consider a toroidal coil construction having a plurality of primary windings, each of one or more turns, each winding having the same number of turns, the primary windings being wound uniformly on a former with the end connections of each winding being close together and arranged either on the inner peripheral face or more preferably on the outer peripheral face. Each pair of end connections may be connected to an associated capacitor and solid state current control unit so that each coil section forms a separate tank circuit section. A secondary or antenna winding may be wound over the primary windings, the primary winding connections extending through the secondary winding. In a high power the secondary winding will require many fewer turns than the primary winding. To carry the large current in a high power transmitter, the secondary winding may be formed of a number of wires in parallel, the turns being distributed uniformly around the toroid.

A simple toroid construction may however not be the most convenient arrangement because of the difficulty in applying the secondary winding and the difficulty in adjustment of the coupling coefficient between the windings. In a pulse transmitter, this coupling coefficient controls the rate of transfer of energy from the tank circuit to the antenna circuit and thus is an important factor in determining the rate of rise of amplitude in the radiated pulse. In a navigation system such as Loran C employing phase comparison of cycles within pulses, cycle identification is necessary and the rate of rise of amplitude must be quite rapid and typically the peak power output should occur on the fifth cycle.

To enable the coupling to be adjusted, it is preferred therefore to wind the primary and secondary windings on separate formers. One form of coil construction in which this is done comprises a cylindrical former having the secondary winding wound around the cylindrical former, a cylindrical shield of conductive material around the secondary winding and, within the shield, a plurality of further formers each carrying a winding or windings of a primary inductance unit, said further formers being disposed adjacent the secondary winding in positions such that each winding of the primary inductance unit is linked only to the flux of the secondary winding in a limited arcuate region but said windings being disposed uniformly around the axis of the assembly. LThe primary windings are preferably disposed between the periphery of the secondary winding and the shield. They are preferably closely adjacent the shield and their end connections are taken out through holes in the shield; thus the associated capacitors and switching devices for the primary winding can be outside the shield. The end connections for each coil section can thus be close together.

An air gap may be left between the primary and secondary windings, depending on the degree of coupling required between the windings.

Preferably each coil section of the primary winding has the same number of turns so that the various coil sections can be connected in parallel.

The secondary winding typically has only a few turns but, because of the large current to be carried in the antenna circuit of a high power transmitter, each turn may comprise a number of wires in parallel.

The cylindrical shield of conductive material is conveniently made of copper and preferably has at least one end face of the shield closed.

Preferably, the separate sections of the primary winding, each occupying an arcuate segment, are distributed around the region within the shield so that the sections together form an assembly extending completely around the space between the shield and the secondary winding with each section linked to only part of the flux field of the secondary winding. By this arrangement, the voltage on each coil section of the primary winding can be made very much less than that on the secondary winding. The primary winding sections may be spaced axially of the secondary winding but preferably are arranged around the periphery of the secondary winding. In the latter case, each coil section of the primary winding is linked to that part of the flux path of the secondary winding passing substantially parallel to the axis of the secondary winding but between the secondary winding and the shield. Each section may be wound on a former shaped to fit between the secondary winding and the shield, with the coil or coils of each section having its axis parallel to the axis of the secondary winding.

Each coil section of the primary winding may comprise a plurality of turns arranged on a former constituting part of a toroid or a straightened segment of a toroid, each of the coil sections having the same number of turns and each coil section having two end connections adjacent to one another on the outer peripheral face, the end connections for the separate coil sections being spaced over the peripheral face. These end connections may be taken through holes in the aforementioned shield.

In one embodiment of the invention, six formers are provided for the primary wnding sections, which formers are shaped so that the formers, with their windings, constitute a closed assembly extending around the axis of the secondary winding, which closed figure has inner and outer flat hexagonal surfaces, each lying in a plane normal to a radial line from the axis of the secondary winding to the center of the surface. On each such former, a number of coil sections, each of only a single turn, are wound, the axis of each coil section being parallel to the axis of the secondary winding.

Instead of using a hexagonal assembly, the coil formers may be shaped to conform more closely to a segment of an annular region, for example, the inner and outer surfaces might each lie in three separate chordal planes.

For a continuous wave transmitter, the solid state units may comprise transistor drive units. In such a power amplifier, a large part of the primary tuning capacitance may be coupled to a single winding having as close a coupling as possible to the multi-winding primary inductance unit.

Thus, for a continuous wave transmitter, a radio frequency power output device as described above may have a series-tuned antenna circuit including said secondary winding, and a further shunt-tuned winding closely coupled to the primary inductance unit and each of said current control units may comprise one or more power output transistors. Typically two transistors might be driven in push-pull. The radio frequency drives for the output transistors may be derived from a common radio frequency drive unit.

As previously mentioned however this invention finds particular application for a high power pulse transmitter. In certain low frequency radio navigation systems, such as for example, the system known as Loran C, it is required to radiate short duration pulses of radio frequency energy at a low radio frequency, for example 100 kHz. The pulses have to be accurately timed and, in Loran C, the phase of the oscillations in the pulses has to be accurately controlled. The present invention is concerned more particularly with the problems of producing high power pulses.

According to one aspect of this invention, a pulse transmitter comprises at least one tank circuit including a capacitor and a primary winding, a uni-directional charging circuit for charging the capacitor, triggerable switch means in the tank circuit for connecting the capacitor to the primary winding, the triggerable switch means permitting of bi-directional current flow; and a secondary winding inductively coupled to the primary winding and arranged in an antenna circuit.

For the reasons previously discussed, there would normally be a plurality of primary windings forming a primary inductance unit, each winding having its triggerable switch means, which constitutes the aforesaid solid state unit. A common charging circuit however may be used for charging all the capacitors in the various tank circuits if the windings are isolated from one another as regards radio frequencies by choice.

In this arrangement, the capacitor in the tank circuit is charged via the uni-directional charging circuit and, after it has been charged, when the radio frequency pulse is to be transmitted, the triggerable switch means are operated to connect the charged capacitor to the primary winding to form an oscillatory tank circuit which is made resonant at the required radio frequency. The oscillations therein are coupled into the secondary winding in the antenna circuit, which is preferably a series resonant circuit also tuned to the required radio frequency.

Preferably there are provided damping resistors for both the tank circuit and the antenna circuit which damping resistors are inductively coupled to the primary winding and secondary winding respectively by trigger controlled switch means which are controlled to switch the damping means into circuit after the peak radiation in order to prevent further radiation of radio frequency energy.

Alternatively damping may be provided by a series resistor included in the secondary circuit which is effectively short-circuited by a thyristor switch during the early part of the pulse, the short circuit being removed to damp or shorten the tail of the pulse. With thyristor switches, the switch will remain closed, after firing, until the radio frequency current falls below a critical value dependent on the thyristor used. Thus, if the damping is active when the thyristor is open, the tail length will be controlled at a low level. If, on the other hand, damping is active when the thyristor is closed, the damping control is lost at low level when the thyristor is opened.

In a transmitter for a radio navigation system of the Loran C type, the envelope of the pulse must be accurately controlled so that it is possible at a receiver to identify a particular cycle in a pulse. In a preferred form the envelope has a rapid rise for the first three cycles and a peak value at about 4 to 7 cycles after the start of the pulse. It is preferable to have a short decay time so as to reduce the total radiation to a minimum. It is sometimes suggested that a long envelope waveform is desirable so as to provide a maximum ratio between the energy contained within say plus or minus 10 kHz of the resonant frequency (typically 100 kHz) and that within the rest of the spectrum. This however is not correct since the interference which might be experienced by any other radio receiver is dependent on the absolute interfering radiation within the band of that receiver regardless of the percentage that that interference has to the total radiation of the interfering radiator. Thus to minimise interference to other users, there is no benefit in providing further radiation of the ratio navigation transmitter at the required frequency. It is thus possible to use a short decay time for the pulse from the radio navigation transmitter.

With regard to the number of cycles before the peak radiation is reached, the follwing facts have to be taken into consideration. If cycle identification is made early, for example at 1½ cycles after the start of the pulse, the envelope of the receiver output will have an envelope starting slope or characteristic which is exponential in character, that is in a given time interval there will be a given percentage rise. With such a slope or characteristic it is impossible to identify a particular cycle. If the cycle identification is made late, for instance the fifth or sixth cycle, the percentage change in amplitude per cycle will be substantially less than for identifying the third cycle. Considered study of the cycle identification problem has indicated that, when the envelope waveform starts as a sharp and perfect ramp, the cycle to be identified should be about the third cycle. For obtaining good phase comparison of cycles and initial lock of the pulse timing, it would be desirable that use is made of signals deeper into the pulse, in fact a pulse longer than the 4 to 7 cycles mentioned above is desirable. For a medium range chain of stations, phase comparison could be made as far in as the eighth cycle. Good phase matching or phase comparison however has no value if there is a whole cycle error and therefore the pulse shape must be chosen to provide the most positive cycle identification.

For charging the capacitor, the aforementioned uni-directional charging circuit preferably is a low frequency resonant charging circuit including a means to block reverse current flow. After completing the first half cycle of an oscillation at the low frequency, the current will attempt to reverse and this reversal will be blocked. This blocking may be effected by a series diode and/or by a uni-directional switch. By using a resonant charging circuit, the capacitor in the tank circuit can thus be charged from a D.C. source to a voltage which is approximately twice that of the supply source.

A thyristor may be included in series with the supply source and capacitor as switching means for the charging circuit to enable the timing of initiation of charging to be controlled. This thyristor will prevent current flow in the reverse direction but it is preferred to employ both a thyristor and a diode in series, the diode preventing the possibility of reverse current or breakdown in the thyristor due to the high voltage. To make the charging circuit resonant at a low frequency, an inductance may be arranged in series with the capacitor in the capacitor charging circuit. This typically is a low loss iron-cored choke coil.

The triggerable switch means in the tank circuit for connecting the capacitor to the primary winding must permit of current flow in both directions. This switch, in a practical embodiment, has to withstand a high reverse voltage. It must be capable of a high rate of change of voltage with time and should have a low loss and a small switching time. It would be possible to use a triac but, at the present time, better results as regards withstanding reverse voltage, obtaining a rate of change of voltage with time, having low losses and short switching time are obtainable by using either two thyristors in shunt back-to-back or by using a thyristor in shunt with a diode. A thyristor with a diode requires only a single trigger input but, with present-day components, a high current thyristor introduces less loss than a high voltage high current diode and, for this reason, it is preferred to use two thyristors in shunt back-to-back.

It is preferred to effect the damping of the tank circuit and the antenna tuning circuit by inductively coupled damping circuits. The tank circuit could be damped by connecting a resistor with a triggerable switch in shunt across the tank circuit. The switch however would have to withstand the high radio frequency voltage in the off state and the maximum permissible voltage will be limited by the dv/dt rating of the thyristor. A higher voltage could be obtained by using thyristors in series but this would make the triggering arrangement more complex.

It is possible to use a 90° delay line or a 90° advance network (at the radio frequency) to invert the action of the switch, that is to say to make the input impedance of the switching circuit zero when the switch is open and equal to a finite value when the switch is closed; thus the switch loss is zero when the damping is switched out. It is preferred to use an advance network rather than a delay network since this not only inverts the action of the switch but also makes the voltage applied to the thyristor switch a more favourable value.

For the tank circuit which is a parallel tuned circuit, it is preferable to insert a parallel resistance whilst for a series tuned circuit it is preferred to insert a series resistance.

In using coupled coils to provide a voltage transformation between the tank circuit and antenna circuit, it is extremely desirable that tight coupling is obtained. A loose coupling will introduce a leakage inductance which can unfavourably alter the envelope of the pulse waveform. This particularly applies to coupling the damping circuits to the primary and secondary windings. A single turn coil will give maximum coupling at a given diameter, width and location with respect to the coil. If the voltage of a single turn in the damping circuit is too great, as previously explained, this single turn can be split into segments by radial wires, the segments being connected in parallel. Typically therefore the coupling coil in the damping circuit comprises a single turn divided into a number of segments with radial coupling wires, the various segments being connected in parallel into the damping circuit.

The use of the multi-segment primary winding enables a high output power in a pulse to be obtained from a radio transmitter using a tapped air cored transformer despite the limitations which arise in practice because triggerable switching devices such as thyristors have a maximum operating voltage and there is a maximum number of Joules which can be handled by each switching device in each pulse. The pulse power depends on the total number of Joules. Essentially therefore the transformer is tapped so that the voltage is the maximum operating voltage of the chosen thyristor or other switching device and it is necessary to divide the coil into separate switched segments, each separately switched, the total number of switching devices and segments being dependent on the total output power required in the pulse.

A radio navigation system may comprise at least three pulse transmitters as described above and spaced apart with a master oscillator at one of the stations controlling the switching to determine the time instants of initiation of the pulses and the timing of initiation of the cycles in the pulses and the other stations being controlled each by an oscillator slaved or locked to the transmissions from the first station.

At a mobile receiver station, the signals from the transmitting station are received and compared in phase and in time to provide thereby positional information.

At each of the slave stations, for receiving the transmissions from the master station there may be provided a receiving antenna with a circuit which out-phases or nulls reception from the local transmitting antenna so as to avoid errors caused by the master signals being re-radiated by the slave transmitting antenna and picked up by the receiving antenna.

At each station preferably the required trigger pulses for initiating the pulses, for initiating charging, for triggering the tank circuit and for operating the damping circuits, are provided in timed relationship using an oscillator and digital frequency divider.

In Loran C, coding for identifying a transmission may be effected by periodically reversing the phase of the transmission without altering the timing. Normally coding is effected by reversing the phase of alternate pulses. The pulses are short duration pulses having only a few cycles of the radio frequency. It is not possible to effect this phase reversal merely by delaying for a half cycle the firing of the triggerable switch means since this would give a corresponding delay to the timing. Although it would be possible to use half cycle time alternations of successive pulses to give phase reversal coding this would require modification of the time format in the receiver compared with existing Loran C receivers.

In a pulse transmitter of the kind described above having triggerable switch means for discharging a capacitor in each tank circuit, there are provided two primary inductance units coupled to the antenna circuit, the two primary inductance units being arranged one on each side of the secondary winding to be inductively coupled thereto. Each primary inductance unit may comprise one or more windings, each winding having its separate triggerable switch. The two primary inductance units may be coupled in opposite phase to the antenna and means provided for firing the switches associated with the two primary inductance units according to the phase of the required transmitted pulse.

One object of using two separate primary inductance units, placed one on each side of the secondary winding, is to facilitate the physical construction by spreading apart the various elements. A further advantage however arises from the ability to operate the device with one primary inductance unit only, the other being inoperative or removed from the circuit. The removal may be physical or electrical. Thus if one unit fails, the transmitter may be operated at half power using only the other primary inductance unit. Providing the coupling or spacing with regard to the secondary is altered to give the same overall coupling as with both primaries in circuit, the pulse shape will remain the same.

A further advantage is that the coupling and the damping of each single primary unit may be adjusted to operate with the other primary unit shorted out. A pulse polarity or other phase change is then possible by changing from one primary unit to the other, e.g. operating the two units alternately. As will be further described, polarity alteration may be made by alteration in the coupling polarity or by change in charging voltage polarity. Thus pulse coding may be obtained.

With this arrangement, a single charging circuit may be used, the charging circuit being connected to both the primary inductance unit but discharged through the selected primary inductance unit according to the switches which have been fired. Thus coding by phase change can be obtained without alteration of the timing of the pulses.

More commonly there would be two sets of windings, one set forming a first primary inductance unit coupled to the antenna in opposite phase relation to the other set forming the second primary inductance unit to give phase reversal coding. All the windings in each set would have separate switches and the firing means arranged to fire the appropriate set of switches.

The charging circuit may be as described above. The switches in this arrangement are preferably switches having two thyristors. The unexcited primary winding or windings would remain open-circuited and would play no part in the pulse generation. The voltage induced in the unexcited primary winding or windings would be relatively low compared with that in the excited winding and it is readily possible to obtain thyristors having a dv/dt rating capable of withstanding the high ratio frequency voltage in the "off" state. The use of two thyristors prevents any current flow through the unexcited winding for both directions of current flow. A switch comprising a single thyristor and a diode, such as has been described above would be undesirable because the diode would conduct in one direction.

In one mechanical arrangement, the antenna coil is arranged with two sets of primary windings, one set being on one side of the antenna coil and the other set being on the other side. To obtain the phase reversal coding, one set of primary windings would be coupled in the opposite phase to the antenna coil compared with the other set and only one set of primary windings would be excited at the time. In a Loran C system, to obtain alternate phase reversal of successive pulses, the switches in the two sets of primary windings would be fired alternately.

In another mechanical arrangement, the antenna coil is spaced apart from the coils forming the first and second primary windings and a coupling circuit is provided tightly coupled to the primary windings to couple energy from the excited primary winding into the antenna circuit. Such a coupling circuit may be a series circuit having coupling coils coupled to the two sets of primary windings and connected in series with the antenna. As before, the unexcited primary windings would be open-circuited and would play no part in the pulse generation. A thyristor shorting switch may be provided to short-circuit the coupling coil of the inoperative unit. This enables a thyristor-diode switch to be used for pulse excitation. Such short-circuiting of the coupling coil also eliminates the dv/dt problem.

The above-described arrangements require two primary windings (or two sets of primary windings) which are selectively energised according to the required phase of the transmitted pulse. It is possible however to use only one primary winding (or one set of primary windings) by providing two charging circuits for charging the capacitor in the primary winding (or capacitors in the primary windings) to a potential of one polarity or the other so that, by selection of the charging circuit and hence the polarity of the potential on the capacitor or capacitors, the phase of the radiated pulse may be selected. Thus in a pulse generator of the type described above having triggerable switch means for discharging a capacitor in the or each tank circuit, there may be provided two separate charging circuits with means for selectively operating one or other of the charging circuits to charge the capacitor in the tank circuit including the primary winding. A plurality of primary windings may be charged in parallel from the selected charging circuit, the two charging circuits thus serving for all the primary windings.

In an arrangement having a capacitor charged selectively to one or other polarity, preferably the switch means in the primary tank circuit comprises two thyristors arranged with opposite polarities with means for selectively triggering one or other of the thyristors in accordance with the polarity of the charge on the capacitor, the other thyristor being fired half a cycle later. This avoids applying a firing voltage to a thyristor having a reverse anode voltage, which may damage the thyristor. In some cases, however it may be possible to apply a single long firing pulse to both thyristors.

BRIEF DESCRIPTION OF THE DRAWINGS

FIG. 1 illustrates part of a pulse transmitter for a radio navigation system;

FIGS. 2 and 3 are explanatory waveform diagrams showing the voltage across the capacitor of a tank circuit and the antenna voltage respectively in the circuit of FIG. 1;

FIGS. 8 and 9 illustrate two equivalent forms of circuit using a 90° advance network and switch to invert the action of a switch;

FIGS. 10, 11 and 12 illustrate three forms of damping circuit;

FIG. 13 shows a single turn coil divided into four sectors;

FIG. 14 illustrates how the four sectors of the coil of FIG. 13 are connected in parallel;

FIG. 15 illustrates a preferred form of trigger circuit;

FIG. 16 is a block diagram illustrating a timing control circuit;

FIG. 19 illustrates in block form a radio navigation system;

FIGS. 20, 21 and 22 illustrate three alternative arrangements for the phase reversal coding of a pulse from a pulse transmitter in a radio navigation system such as a Loran C system;

DESCRIPTION OF THE PREFERRED EMBODIMENTS

Figure 3:
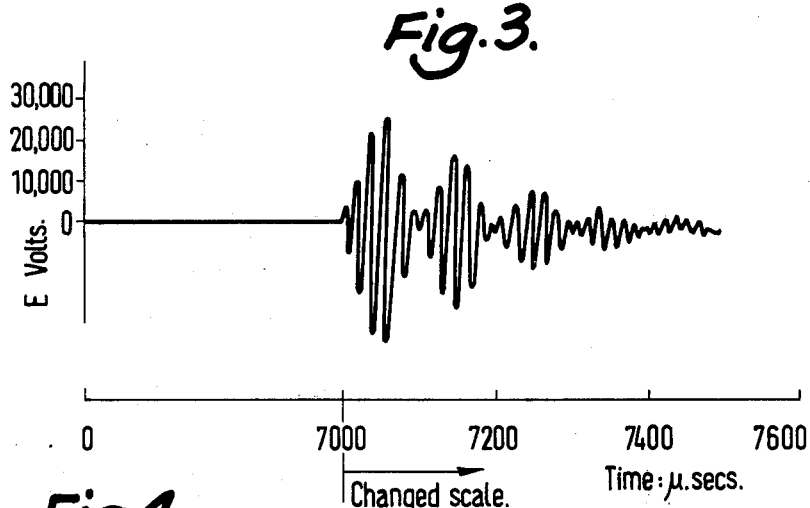

The invention is particularly applicable to high power pulse transmitters and, before describing the preferred forms of coil constructions for use in a high power transmitter, it is convenient firstly to describe the pulse generating circuit.

In FIG. 1, which shows in diagrammatic form the components required for explanation of the operation of one form of radio frequency pulse transmitter, there is a D.C. power supply source 10, typically providing a 600 volt supply, which source is used to charge a capacitor 11 in a tank circuit formed by the capacitor 11 and primary winding 12, the tank circuit being completed by a bi-directional switch comprising a diode 13 and a thyristor 14 triggerable by a trigger input 15. Typically the tank circuit is tuned to a frequency of the order of 100 Hz. The capacitor 11 is charged from the D.C. supply source 10 via a low frequency resonant charging circuit, the capacitor 11 being charged for a half cycle at this low frequency. This low frequency resonant charging circuit comprises an iron-cored inductance 16 which, with the capacitor 11 forms a circuit which in this particular case is resonant at a frequency of about 80 Hz. Thus a half cycle of this low frequency has a duration of 6250 microseconds. The charging circuit is completed by a switch comprising a thyristor 17 which is triggered by a trigger pulse from a trigger circuit 18 via a transformer 19. A diode 20 is included in series with the thyristor to prevent the possibility of reverse current or breakdown in the thyristor 17. The charging circuit includes an overload relay 21 which has contacts 22 normally closed to provide a shunt path across a capacitor 23, the shunt path including a resistor 24 of small magnitude and inductor 25 also of small magnitude. The overload relay has an operating coil 26 through which the charging current from capacitor 11 passes.

A surge damping arrangement comprising a diode 27 and a resistor 29 is connected in shunt across the charging circuit. A series inductance 28 is connected in the charging circuit between the damping circuit 27, 29 and the capacitor 11, this inductor 28 having an inductance of small magnitude compared with that of the iron-cored inductor 16 but of large magnitude compared with the tank circuit inductance. Inductor 28 acts as a smoothing filter for surge voltages and as an isolation impedance to prevent the radio frequency oscillation in the tank circuit from passing back to the charging circuit.

The antenna circuit is series tuned and comprises a secondary winding 30 which is coupled to the aforementioned primary winding 12 in series with a capacitor 31 and resistance 32, this capacitance and resistance being the capacitance and resistance of the antenna.

For damping the tank circuit, there is provided a damping resistance 33 which is connected in a circuit including a winding 34 coupled to the primary winding 12 and a triggerable switch 35 to be described in further detail later. For damping the antenna circuit there is provided a resistor 36 in a damping circuit including a winding 37 coupled to the secondary winding 30 and a triggerable switch 38. Switches 35, 38 are controlled by a trigger unit 39.

Before describing the operation of the circuit of FIG. 1 in detail, it may briefly be mentioned that the capacitor 11 is charged from the D.C. supply source 10 via a low frequency resonance circuit so that it can be charged to a voltage twice that of the supply source thereby giving the present example a charging voltage of 1200 volts. At the appropriate time instant, this capacitor 11 is discharged through the thyristor 14 and diode 13 (forming a low loss switching device) and primary winding 12 (which forms a low loss inductance) so as to produce an oscillatory current in the primary winding 12 at the resonant frequency of the tank circuit. The antenna circuit is a series resonant circuit coupled to the primary winding. This coupling arrangement is equivalent to a series resonant circuit in shunt with the primary in which the inductance of that series resonant circuit is equal to the primary inductance multiplied by the inverse of the square of the coupling coefficient. With this coupling, the primary energy is alternately transferred from the primary to the secondary and back, the frequency of the transfer being dependent on the coupling coefficient. It may be shown that if the primary and secondary windings are resonated at 100 KHz and the power peak of the secondary winding is to be reached in five cycles the coefficient of coupling should be 10%.

FIG. 2 illustrates the waveform across the tank circuit. In this figure, the time scale is not uniform, the charging time being shown to a much reduced time scale compared with the time scale used for illustrating the radio frequency waveform. The pulses in this particular example occur at a frequency of 100 Hz and thus the cycle period for the pulses is 10,000 microseconds. As stated above the time for charging is typically 6250 microseconds. The charging current is shown in FIG. 2 between the points A and B and is one half cycle at the resonant frequency of the low frequency resonant charging circuit. The resultant voltage at the end of this half cycle is approximately double the supply voltage. After completing a half cycle of oscillation at this low frequency, the current will attempt to reverse and this reversal is blocked by the series diode 20 as well as by the thyristor 17. The deviation from twice the supply voltage will depend on the losses in the inductance 16 and switch 17 but this can be made small by proper choice of the circuit elements in the series resonant charging circuit.

At the point C where thyristor 14 is fired, typically 7,000 microseconds after the start of the cycle, the radio frequency oscillation is started. The energy in the primary or tank circuit is transferred to and absorbed by the coupled secondary or antenna circuit and FIG. 3 shows the voltage waveform in the antenna circuit. The secondary winding 30 has many more turns than the primary winding and thus the voltage ultimately reached by the radio frequency oscillations in the antenna circuit is much higher than that in the primary circuit, typically of the order of 20,000 to 30,000 volts. As explained earlier the energy is alternately shifted from the primary winding to the secondary winding and back again at a frequency, which in this particular example is 5 KHz. Each cycle at this frequency thus corresponds to 20 cycles of the radio frequency energy. At the null at each half cycle of this alternate shifting of the energy, there is a reversal in phase. This is not a desirable characteristic nor is the long delay in the suppression of the pulse. Thus the damping is switched on by closing switches 35 and 38 at the peak of the antenna voltage, that is to say at the fifth cycle of the radio frequency oscillation. The rapid three cycle rise in the antenna circuit provides a signal giving good cycle identification at the receiver and the elimination of skywave contamination of the signal used for phase comparison. The damping is chosen so that the overall Q of the oscillatory circuit when damped provides a desired pulse shape.

Figure 4:
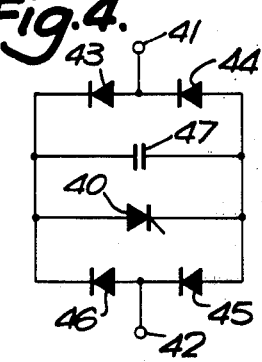
FIGS. 4, 5 and 6 show respectively three forms of triggerable switches for use in the circuit of FIG. 1.
Figure 5:
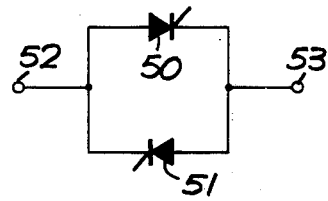
Figure 6:
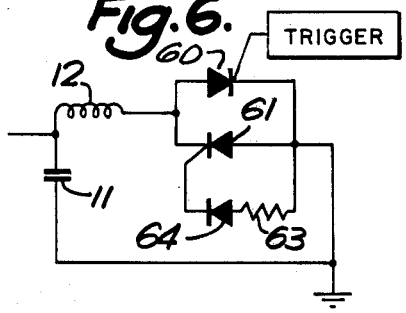

FIG. 4 illustrates one arrangement for using a thyristor to switch an alternating current. In FIG. 4 a thyristor 40 acts as an alternating current switch between terminals 41, 42 by being connected as a diagonal across a bridge circuit formed by four diodes 43, 44, 45, 46. The thyristor may be shunted by a capacitor 47. FIG. 5 illustrates another form of alternating current switch in which two thyristors 50, 51 are arranged back-to-back in shunt between terminals 52, 53. In the arrangement of FIG. 5 both the thyristors have to be triggered at the appropriate time instant. It would be possible to replace one of the thyristors by a diode so that only a single trigger input was required but a high current thyristor introduces less loss than a high voltage high current diode with present forms of such equipment. FIG. 6 shows a preferred form of switch using two thyristors but requiring only a single trigger input. In FIG. 6 there is shown the primary winding 12 and tank capacitor 11 together with two thyristors 60, 61 connected in shunt back-to-back in the tank circuit. A trigger signal is applied to the trigger input of thyristor 60. The thyristor 61 is triggered from the resultant radio frequency oscillation by a trigger circuit comprising a resistor 63, typically of 20 ohms, and diode 64.

Circuits of the form shown in FIGS. 4 and 5 might be used as the switches 35 and 38 for switching in the damping circuit. Damping of the tank circuit might be effected by switching a resistor directly in shunt across the capacitance and inductance of the tank circuit. This however is practice leads to problems because of the high rate of voltage change. The radio frequency voltage applied to a thyristor in the off state is limited by the dv/dt rating of the thyristor. Moreover it is desirable to have the switch open and lossless during the first 50 microseconds of the pulse, that is to say during the first five cycles. A higher voltage rating can be obtained by using thyristors in series but this complicates the triggering. It is preferred therefore to use a coupled arrangement such as is shown in FIG. 1. Similarly in the antenna circuit, the damping could be achieved by including a damping resistance in the antenna circuit with a switch in shunt across the damping resistance to short-circuit that resistance when damping is not required. Again the problem arises however of the high voltage on the thyristor.

Figure 7:
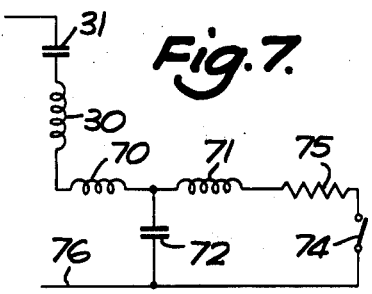
FIG. 7 illustrates diagrammatically a 90° delay line and switch for inverting the action of a switch.

FIG. 7 shows the use of a three element 90° delay line to invert the action of a switch such as might be used in the antenna for damping. Referring to FIG. 7, the delay line is constituted by a T-network having two series inductances 70, 71 and a shunt capacitance 72 arranged to give a 90° delay at the radio frequency. This delay line is connected in series with the antenna capacitance 31 and secondary winding 30. A thyristor switch 74 in series with a resistor 75 is connected across the other end of a delay line. When the switch is opened, the effective impedance between line 76 and the junction of winding 30 and inductance 70 is zero. When the switch is closed however this impedance is equal to $Z^2/R$ if the impedances of 70, 71 and 72 are all equal to Z and where R is the magnitude of resistor 75. Thus the switch loss is zero when the damping is switched out.

FIG. 8 illustrates another circuit which might be used for switching an impedance in the antenna circuit. The arrangement of FIG. 8 uses a 90° advance network to replace the delay network of FIG. 7. This 90° advance network is constituted by a T-network with series capacitances 80, 81 and shunt inductance 82. One end of this advance network is connected in series with the antenna capacitance 31 and winding 30 whilst the other end of the advance network is connected across a thyristor switch 83 in series with the resistance 84. This advance network not only inverts the action of the switch but also serves to change the voltage applied to the switch to a more favourable value. Again the switch loss is zero when the damping is switched out. FIG. 9 shows a coupled equivalent to the circuit of FIG. 8 with an inductance 90 and capacitance 91 connected in a series circuit with a resistance 92 and thyristor switch 93, the inductance 90 being coupled to the antenna winding 30. Using a coupled circuit, it again becomes possible substantially to reduce the voltage at the switch thereby avoiding the problems due to the limited rating of the thyristor.

In a series tuned circuit it is desirable to insert a series resistance for damping and in a parallel tuned circuit it is desirable to insert a parallel resistance for damping. FIG. 10 illustrates in diagrammatic form a parallel damping circuit using a resistor 100 and thyristor switch 102 as damping across a tuned circuit comprising capacitor 103 and inductance 104. FIG. 11 illustrates a coupled equivalent of the circuit of FIG. 10. The tuned circuit as before comprises capacitor 103 and inductance 104. Coupled to inductance 104 is an inductance 105 with a damping circuit comprising inductance 106 and capacitance 107, resistor 108 and thyristor switch 109. The coils are closely coupled to provide a desired transformation ratio, which might typically be a 30:1 reduction ratio in the transmitter using voltages such as have been given above as examples. A loose coupling would introduce a leakage inductance which can unfavourably alter the envelope of the pulse waveform. FIG. 12 shows a direct coupled equivalent of the circuit of FIG. 11. In FIG. 12 there are shown a capacitance 110 and inductance 111 may be respectively the capacitance 31 and inductance 30 of the antenna circuit. FIG. 12 has a T-coupling network comprising three inductors of equal magnitude 112, 113 and 114 providing coupling via an inductance 115 to terminals 116, 117 across which the switch is connected. This switch comprises inductance 118 and capacitance 119, resistor 120 and a triggerable switching device 121.

As previously mentioned, if the damping circuits are coupled to the tank circuit and antenna circuit, tight coupling is desirable to avoid any leakage inductance. A single turn coil in the damping circuit may give a voltage which is too great for convenient switching by the switch circuits 35, 38. In this case the coupling coil in the damping circuit may be divided into a number of segments such as for example shown in FIGS. 13 and 14. In FIG. 13 a single turn coil is divided into four segments 130, 131, 132, 133 with radial leads at the ends of each segment. The segments are connected in parallel as shown in FIG. 14, each with an associated damping resistance 135. A thyristor switch 136 is connected across this parallel circuit.

The voltage of each section is proportional to the area of the section multiplied by the number of turns of each section. Thus a coil having a single section comprising one complete turn will have a voltage which is "n" times as great as each of "n" identical sections of one complete turn. The sections are made up by using close parallel wires as radials in which each pair has equal current in opposing directions, the net effective current of the radials pair is zero. The parallel lead radials therefore provide a means to voltage tap a single turn coil without altering the equivalent. An alternative explanation is had by the fact that a closed circuit having zero area has zero inductance, and therefore a pair of parallel wires having equal currents and enclosing a zero area has zero inductance.

The tapping of a one turn coil by use of parallel radials can be obtained either by inward or outward radials. In the case of outward radials the equivalent of a second outer single turn coil is formed. A close short-circuited outer coil will reduce the inductance of that outer turn to substantially zero. A practical short-circuited turn is in effect a shield can.

Further description of the coil construction will be given later. Before doing so however, it is convenient to discuss in further detail the trigger circuit and the manner of control of the trigger circuit in a radio navigation system.

FIG. 15 illustrates a preferred form of trigger circuit for triggering the thyristor switch. In FIG. 15 the input pulse for initiating triggering is applied to input terminals 146, 147 which are the terminals of the input circuit comprising a series resistor 148 and a shunt inductance 149 across the base to emitter circuit of an n.p.n. transistor 150 which is coupled in the known way to a p.n.p. transistor 151 to form a thyristor equivalent. The choke coil input ensures that this equivalent of a thyristor cannot remain locked-on. The two transistors 150, 151 form a switch for a further transistor 153 connected in an oscillatory circuit comprising capacitor 154 and a primary winding 155 of an iron-cored transformer having an output winding 156 from which the trigger signals are fed to the appropriate thyristor. The emitter of transistor 153 is connected via a resistor 157 to a positive voltage supply terminal 158 and the collector of transistor 153 is connected to the junction between the primary winding 155 and the emitter of transistor 151. The base of transistor 153 is maintained at a constant potential by a potential divider between terminal 158 and ground so that transistor 153, when conductive, draws a constant collector current. When an input trigger pulse is applied to terminals 146, 147 to make transistors 150, 151 conductive, the potential at the left hand side of capacitor 154 drops to ground potential. As the current cannot be reversed through the switching transistor 153, the oscillatory discharge of capacitor 154 will last for only half a cycle of the oscillating frequency of the resonant circuit. Only one quarter of a cycle on the secondary winding 156 is a positive trigger signal and the circuit thus provides a short and strong trigger pulse. The transistors 150, 151 cut-off after the half-cycle oscillatory discharge. The capacitor 154 is recharged by a constant current through the transistor 153 after the transistors 150, 151 are cut-off to provide a minimum of charging time.

FIG. 16 illustrates, in block diagram form, the control of the trigger circuits for the various switches. An oscillator 160 provides signals to a digital divider 161 feeding outputs to timing gates 162 to provide a first trigger output 163 for the tank circuit control 15, a second trigger output 164 for the damping switch control 39 and a third trigger output 165 for the charging control 18. By the use of a digital divider circuit, accurate timing of the various switches is obtained. For the charging circuit, the duration of the trigger pulse is long but is shorter than the total charging time; the long pulse is required as the thyristor current is too low for the thyristor to lock-on. For switching the tank circuit and the damping circuits, since the switches are high frequency, high current, alternating current switches, the trigger pulses may be short for the required closing and latching-on of the switch. This is readily achieved however with a digital timing circuit such as is shown if FIG. 16.

Figure 17:
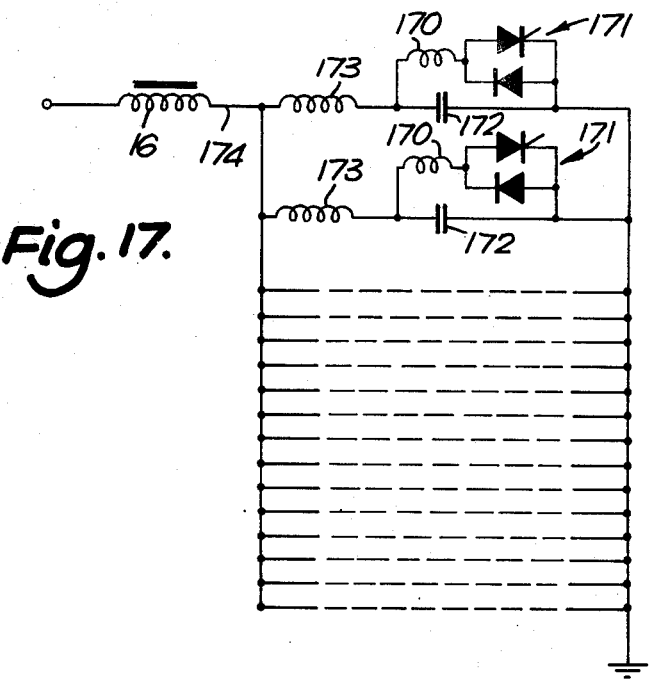
FIG. 17 illustrates a tank circuit having a number of separate windings.
Figure 18:
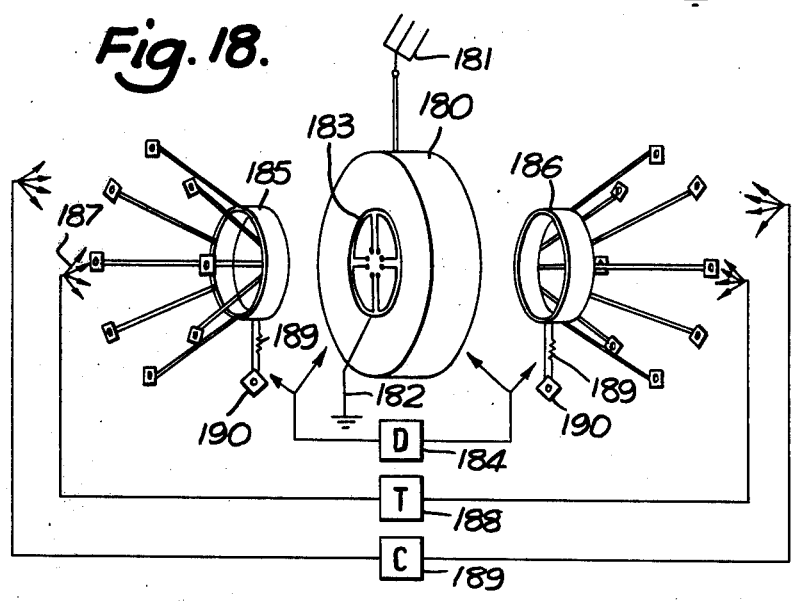
FIG. 18 illustrates diagrammatically a mechanical arrangement of the circuit of FIG. 17.

The switch to effect the oscillatory discharge of the tank circuit requires a fast switch-on and a high di/dt capability, a low loss and a high breakdown voltage. The breakdown voltage can be increased by using units in series. This however increases the voltage drop and the loss when the switch is on. Parallel units to increase the di/dt capability is bad practice as it is difficult to provide uniform distribution to each unit. Using a large thyristor having a high current ratio will not increase the di/dt in proportion. Moreover the switching speed of larger thyristors is generally slower than for small thyristors. It is desirable therefore to have a circuit arrangement which will use a number of thyristors of high voltage rating in such a manner as to provide separate circuits giving equal distribution of current to each thyristor. It is convenient therefore to use a coupled tank and antenna circuit in which the tank circuit comprises a pair of coils symmetrically coupled to the antenna coil. Each of these coils in the tank circuit comprises eight separate and symmetrically disposed windings. Such an arrangement is illustrated in FIGS. 17 and 18. Each of the sixteen separate windings in the tank circuit has its own capacitor and switch.

Referring to FIG. 17 there is shown part of the tank circuit with the iron-cored inductance 16 in the charging circuit. The tank circuit has 16 parallel tank circuits, each comprising a primary winding 170 with its associated switch 171 and capacitor 172 connected across the primary winding and switch. The primary windings are isolated from one another as regards radio frequencies by radio frequency choke coils 173 although they are connected in parallel via their respective choke coil 173 to the charging circuit 174.

The mechanical arrangement is illustrated in FIG. 18 where there is shown the secondary winding 180 in the antenna circuit, connected between the antenna 181 and earth 182. This secondary winding has an associated coupled winding 183 divided into four sectors for a damping circuit, as described with reference to FIGS. 1 and 14, the control switch being controlled by a damping control input shown diagrammatically at 184. The tank circuit comprises two coils 185, 186, one on each side of the antenna coil and arranged symmetrically with respect thereto. Each of these coils 185, 186 comprises eight separate windings each with its own capacitor and switch. The tank circuit control switches are indicated diagrammatically at 187 being controlled by a common control circuit input 188. Damping is provided as previously described and as is shown diagrammatically in FIG. 18 by resistor 189 and switch 190 controlled from the damping control input. The single charging circuit is not illustrated in FIG. 18 except in so far as the control signal input 189 for controlling the switch 17 in the charging circuit is shown.

The following is a typical example of the characteristics of an embodiment of transmitter and antenna as described above:

Antenna = 300 ft. with effective height of 126 ft.
Radiation resistance = .27 ohms.
General resistance = 1.73 ohms.
Antenna series damping resistance = 40 ohms.
Antenna capacity = 4000 pf.
Resonant and radiated frequency = 100 K.C.
Tank capacity, total = 3.52 uf, 16 × .22 uf
Tank capacity charging voltage = 1200 v.
Tank parallel damping resistance = 4.5 ohms. p1
Coefficient of coupling = 10%
Peak tank current = 2640 amps, 16 × 165
Peak antenna voltage = 35,600 volts.
Peak antenna current = 89, 63 amps R.M.S.
Peak antenna radiation = 980 watts.
Joules per pulse = 2.53
For 100 pulses per second:
Watts input = 253
Radiated watts in first 30 m.sec of pulses = .70 watts
Radiated watts in first 50 m.sec of pulses = 2.67 watts Total radiated power = 5.4 watts
Watts to be dissipated by damper resistances = 160 watts.

FIG. 19 illustrates diagrammatically a radio navigation system making use of pulse transmitters such as have been described above. This navigation system comprises a master station having a master oscillator 190 and pulse transmitter 191 coupled to an antenna 192. Typically pulses at a repetition frequency of 100 per second are radiated at a radio frequency of 100 KHz, the duration of the pulses being as described above. Spaced from the master station are two slave stations, only one of which is illustrated. Each slave station comprises a receiving antenna 193 with a receiver 194 for receiving signals from the master station to control a locked oscillator 195 locked in synchronism with the master signals. This oscillator 195 controls the timing of the cycles in the pulses from the pulse transmitter 196 coupled to a radiating antenna 197, the pulse transmitter and antenna being of the form described above. A pulse timer 198 controls the timing of the pulses in fixed time relation with the master pulses. The receiving antenna 193 has an associated circuit to outphase or null reception of master signals by re-radiation from the slave station antenna so that the locked oscillator is controlled by the directly received master signal.

To provide distinction at a mobile receiver between the signals from the two slave stations, the signals from one of the slave stations are transmitted with alternate pulses deviating from equally spaced time intervals by one half cycle of the radio frequency.

A receiver for use with such a transmitting system may be generally similar to a Loran C receiver but adapted to receive single pulses at the required rate and also to distinguish between master and slave stations having the coding described above or some other distinguishing alteration.

Figure 22:
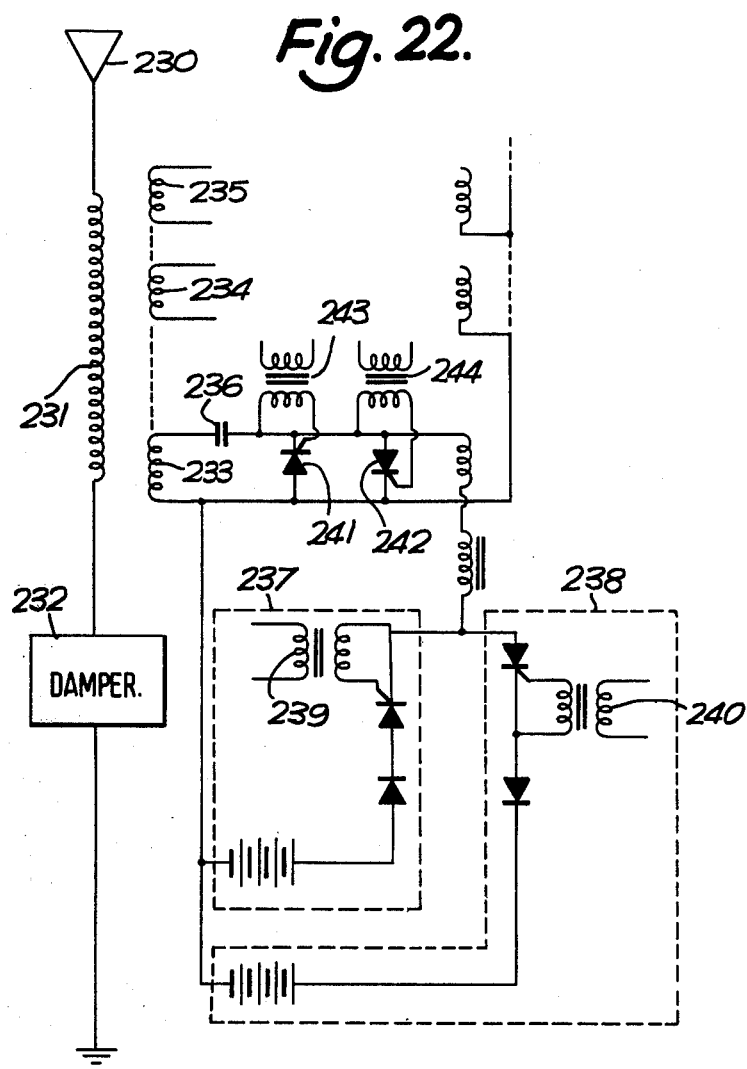

FIGS. 20, 21 and 22 illustrate three alternative arrangements for the phase reversal coding of a pulse from a pulse transmitter in a radio navigation system such as a Loran C system.

Referring to FIG. 20 there is shown diagrammatically an antenna 210 with an antenna coil 211 and two primary windings 212, 213 arranged one on each side of the antenna coil and coupled thereto. Associated with each primary winding is a capacitor 214 and a double thyristor switch 215 completing the resonant tank circuit. The capacitors for both primary windings are changed from a common charging circuit 216. Physically the arrangement may be similar to that described with reference to FIG. 18 above, each primary winding comprising a set of coils each with an associated capacitor and switch. In the arrangement of FIG. 20 however the two primary windings 212, 213 are coupled in opposite phase to the antenna circuit and switch control means 217 are arranged to provide a trigger pulse to the switch 215 (or switches) for one or other of the primary windings 212, 213 so that only one primary winding is excited. Thus the two primary windings may be excited alternatively to give phase alternation of the pulses from the antenna as required in coding arrangements employed in Loran C systems.

FIG. 21 illustrates another arrangement in which an antenna 220 with an antenna coil 221 is energixed via a coupling circuit 222 including in series coupling coils 233, 224 which are tightly coupled to two primary windings 225, 226 respectively. The primary windings and the coupling coils may be constructed, as will be further described later, with each primary winding having a plurality of coil sections each with its own triggerable switch. Trigger pulses from a source 227 are applied via line 228 or line 229 to the switches for one or other of the sets of primary windings 225, 226 so as to excite a selected one of the primary windings by discharging capacitors through the various coils constituting the winding sections. The two primary windings 225, 226 and the coupling coils 223, 224 are arranged to give opposite phase coupling to the antenna circuit so that phase reversal coding of the transmitted pulses may be obtained by appropriate selection of one or other of the leads 228, 229 for applying trigger pulses to the selected winding. The switches are double thyristor switches so ensuring that the coil sections for the unexcited primary winding remain open-circuited and therefore do not play any part in the pulse generation.

In the arrangement shown in FIG. 22, an antenna 230 has an antenna winding 231 with a damper 232 referred to as a "tail" damper since it is used for damping the tail of the pulse. The antenna winding 231 is coupled to a plurality of primary windings of which three are shown at 233, 234, 235. There may be a large number of such primary windings (e.g. several hundred) which are connected, each with its capacitor and switch, in parallel circuits. One of these circuits, containing winding 233, will be described in further detail. This circuit has a capacitor 236 which may be charged from one or other of two charging circuits 237, 238 of opposite polarity. These charging circuits are similar to those previously described and will not be described in further detail beyond noting that the two charging circuits have separate trigger inputs at 239 and 240 whereby either one of the charging circuits may be utilised selectively to charge the capacitor 236. The primary circuit has two thyristors 241, 242 connected as switches for completing the circuit but arranged to be of opposite polarity. These thyristors 241, 242 have separate firing circuits including isolating transformers 243, 244 for the application of trigger pulses. A control circuit 245 provides control pulses for triggering the charging circuits and the thyristor switches. According to the required polarity of the transmitted pulse, one or other of the charging circuits is made operative to charge the capacitor 236 to the required polarity and the oscillatory discharge is then initiated by triggering the appropriate one of the two thyristors, that is to say the one that has a potential such that it immediately conducts. The other thyristor is triggered half a cycle later.

Relatively long trigger pulses may be employed but the thyristors are sufficiently slow in operation that, if triggered, they would remain fired during the oscillations of the radio frequency pulse until the voltage has decreased to quite a low value. After the required number of radio frequency cycles, the pulse is damped by the damping circuit 232.

Figure 23:
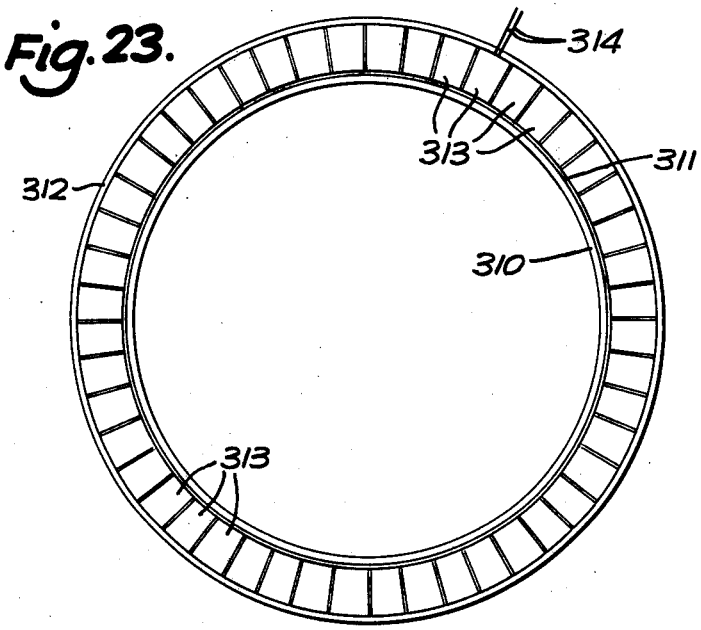
FIG. 23 is a cross section in a diametral plane parallel to the axis of a cylindrical coil assembly.
Figure 24:
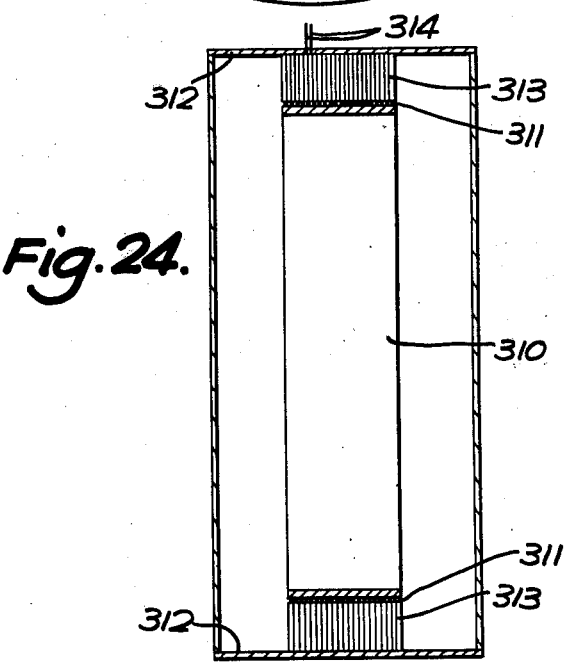
FIG. 24 is a diagrammatic side elevation showing the arrangement of coil sections of the primary winding and the coil assembly of FIG. 23.

Referring to FIGS. 23 and 24 there is shown a coil assembly comprising a cylindrical former 310 on which is wound a secondary winding 311 which, in this particular case, consists of four turns. Each turn comprises twelve wires in parallel, the wires being uniformly spaced over the peripheral surface of the coil former 310. Each wire is a Litz wire having 729 strands. Surrounding the former and secondary winding is a copper shield 312 of cylindrical form with two closed ends. The primary winding comprises 46 separate sections 313 each extending around a segment of the annular region between the secondary winding and the cylindrical inner surface of the shield 312. Each section 313 comprises 44 separate coils formed of stranded wire having 729 strands, the 44 coils in each section being interleaved, each of these 44 coils comprising of a single turn, the end connections of each coil being taken out through holes in the shield, as shown for example at 314. There will thus be 2024 separate coils each with two end connections 314. The two end connections for each coil are closely adjacent. It will be noted that each primary section coil is wound around the section former so that the axis of the coil is parallel to the axis of the secondary winding 311 but lies within the space between the secondary winding 311 and the shield 312. Thus each primary winding coil is linked to 1/46th of the flux of the secondary coil and therefore the voltage per turn of the secondary winding is 46 times the voltage on each primary coil. The leakage of the primary windings would be large but, provided adjacent coils have equal currents, the leakage voltages of the radial connecting wires will cancel.

Each of the coils of each section has its associated capacitor and triggerable switching device to constitute a tank circuit section of a pulse transmitter, the various sections being connected in parallel for charging as previously described. The secondary winding 311 is connected in the antenna circuit. Switched damping means may be provided for the primary and secondary coils, also as described in the aforementioned specification.

It will be seen that this coil assembly construction has enabled the voltage on the switching devices to be reduced approximately to 1/46th of what it would have been for a single conventional coil and has reduced the power handling requirements for the switching devices by a factor of 2046.

FIGS. 25 to 28 illustrate another construction of coil assembly. This coil assembly externally is of hexagonal form in plan. It has an outer copper shield 318 comprising six side portions 320 forming a hexagon and a closed top 321. The bottom end of the shield is open. Within this copper shield are a cylindrical former 322 carrying a secondary winding 323 and a hexagonal former formed of six separate sections 324. The hexagonal former fits closely within the copper shield and the cylindrical former 322 is coaxial with and lies inside the hexagonal former 324 and is surrounded by the latter. The secondary winding 323 on the cylindrical former 322 is formed as before of a few turns, each turn comprising a number of wires in parallel, each wire being stranded Litz wire for example having 729 strands.

Figure 26:
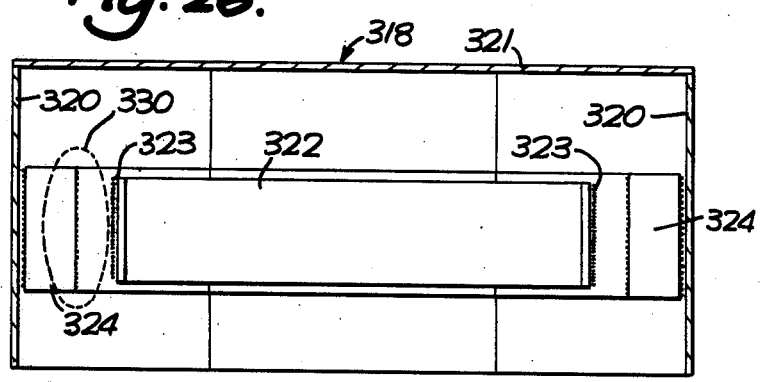
FIG. 26 is a cross section through the coil assembly of FIG. 25.
Figure 27:
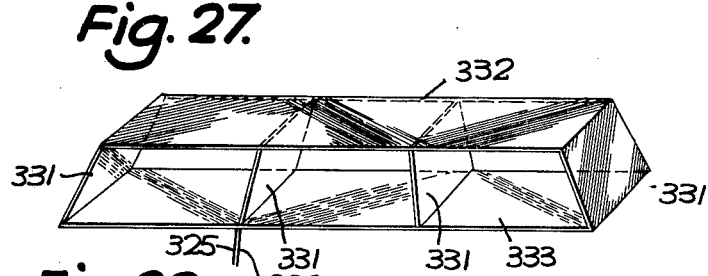
FIG. 27 is a diagrammatic isometric view of one section of a primary winding assembly used in the coil assembly of FIGS. 25 and 26.
Figure 28:
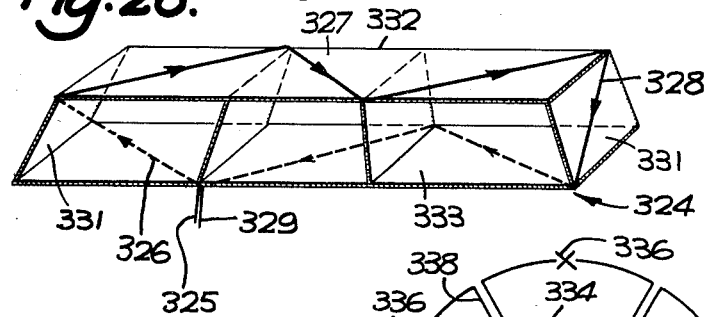
FIG. 28 is a diagram illustrating the path of one of the turns of the coil assembly of FIG. 27.

FIG. 27 shows one of the primary winding sections. This primary winding section carries 64 coils each of one turn, each coil being wound with stranded Litz wire. Each turn extends from an end connection (e.g. connection 325) on the outer peripheral face of the hexagonal unit, as shown in FIG. 28, over a path 326 along that face, then across one of the end faces of the unit 324 and thence in a zig-zag path along the inner peripheral face 327 to the other end face across which it passes at 328 and so back over the outer peripheral face to the second end connection 329 which is closely adjacent the first end connection of that coil. The turns are arranged to zig-zag across the inner and outer peripheral faces as shown in FIGS. 27 and 28. It will be noted however that the windings do not extend across either the top or bottom faces of the unit and thus each of the turns shown in FIG. 28 constitutes in effect a single turn giving a flux path which extends through the unit in a direction from bottom to top as shown by the dashed line 330 in FIG. 26. The formers for the primary winding sections comprise essentially four rectangular plastic sheets 331 which lie in radial planes with respect to the axis of the secondary winding and inner and outer rectangular plastic sheets 332, 333 forming the inner and outer surfaces of the hexagonal unit. These sheets are all notched at their edges to retain the wires which are woven around the unit. All these sheets lie parallel to the axis of the coils and do not extend across the flux path.

The voltage of each coil section is proportional to the area of the section multiplied by the number of turns of each section. Thus a coil having a single section comprising one complete turn will have a voltage which is n times as great as each of n identical sections of one complete turn. Close parallel wires are used as radial input and output connections, each pair of such wires having equal current in opposing directions so that the net effective current of the two radials forming pair is zero. The tapping of a one turn coil by the use of parallel radials can in principle be obtained either by inward or outwardly-directed radials. In the arrangement of FIGS. 25 to 28, outward radials are used for convenience in construction, the connections such as 325, 329 being taken out through holes in the shield 318. Such outward radials give the equivalent of a second outer single turn coil. The shield 318 however forms a close short-circuited outer coil which will reduce the inductance of that outer turn to substantially zero. The end connections outside the shield may be connected there to a separate capacitor and a triggerable switch for each coil as previously described. These end connections are distributed uniformly over the outer surface.

Figure 29:
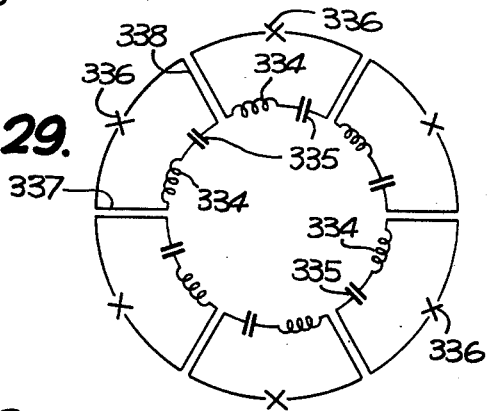
FIGS. 29, 30 and 31 are explanatory circuit diagrams for explaining the coil construction of FIGS. 25 to 28.

Thus in the arrangement of FIGS. 25 to 28 there are effectively 384 one turn coils. In each of the six sections, the 64 coils with their associated capacitors are connected in parallel. FIG. 29 shows an equivalent circuit diagram with the six sections each shown as comprising an inductance 334 and capacitance 335, the inductance representing the inductance of 64 single turns in parallel and the capacitance being the parallel capacitance of the 64 capacitors. Across each of the sections is a triggerable switch as indicated at 336. It will be understood however that the two end connections for each section, such as those at 337 and 338 are closely adjacent physically for the reasons described above.

Figure 25:
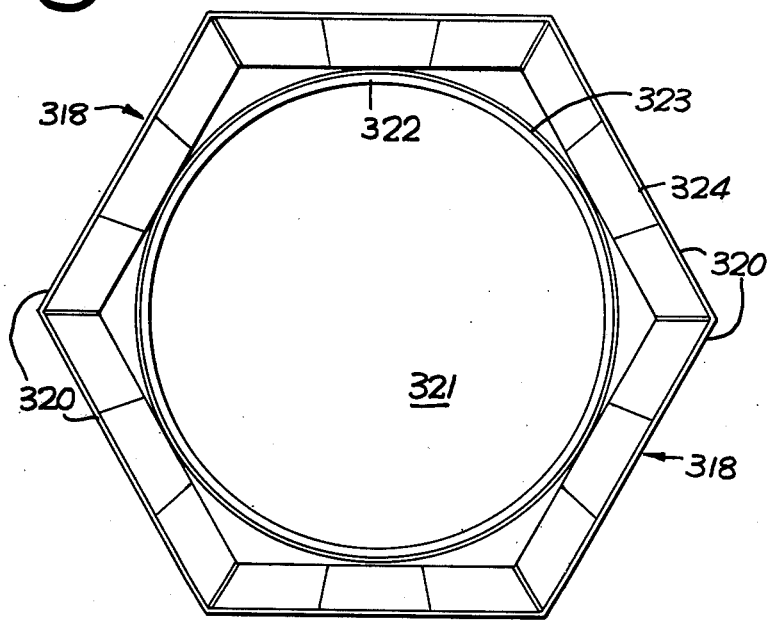
FIG. 25 is an undesirable plan view of another form of coil assembly.
Figure 30:
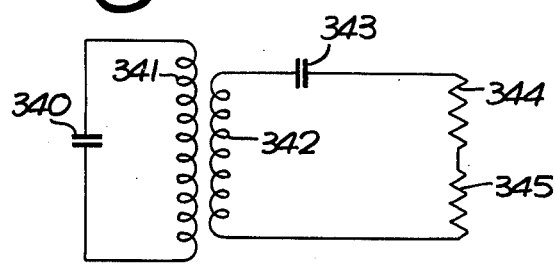

FIG. 29 is a simplified circuit diagram illustrating the use of the coil system of FIGS. 25 and 26 in a pulse radio transmitter operating at a frequency of 100 kHz and transmitting short duration pulses on a time basis which might typically be eight pulses spaced 1 millisecond apart at a rate of eight such pulses in each period of 0.1 seconds. Each pulse might typically have a rise time such that maximum amplitude is reached in the fifth cycle of the radio frequency oscillations and thereafter is damped as rapidly as possible. In FIG. 30 the tank circuit is shown as comprising a capacitor 340 and inductance 341 which inductance is mutually coupled to the antenna inductance 342, arranged in an antenna circuit which has a capacitance represented at 343 (comprising primarily the antenna capacity), a resistance 344 representing physical resistance in the antenna circuit and diagrammatically the radiation resistance 345. In this particular embodiment the tank circuit has a capacitance of 2.396 microfarads and an inductance of 1.08 microhenries. The coupling coefficient is 10% and the anetnna circuit inductance is 189 microhenries. The resistance 344 in the antenna circuit might be 0.5 ohms and the radiation resistance 1.9 ohms. The damping circuits for damping the tank circuit and antenna circuit are not shown; these may be constructed and arranged as previously described.

To form the tank circuit of FIG. 29, there are 384 effective coil sections and each has a capacity of 0.22 microfarads. The inductance L of a coil is given by the expression:

$$L = 4\pi n^2 A \mu \ 10^{-9}/1$$

where n = number of turns
 A = effective area of the flux path
 $\rho$ = permeability = 1
 1 = effective length of the flux path In the structure of FIGS. 25 and 26 the effective area of each of the primary section coils is the area between the inner and outer hexagons, the effective flux length is somewhat more than twice the length of the coil. In a typical construction for a pulse transmitter as just described, the length of the coil might be made 10 inches and the spacing between the inner and outer hexagons might be made 2½ inches. The hexagonal sections are nearly three feet long. The coupling coefficient is determined by the amount of flux linked with the secondary coil and this is therefore controlled by the positioning of the secondary coil and the dimensions of the secondary coil former.

Figure 31:
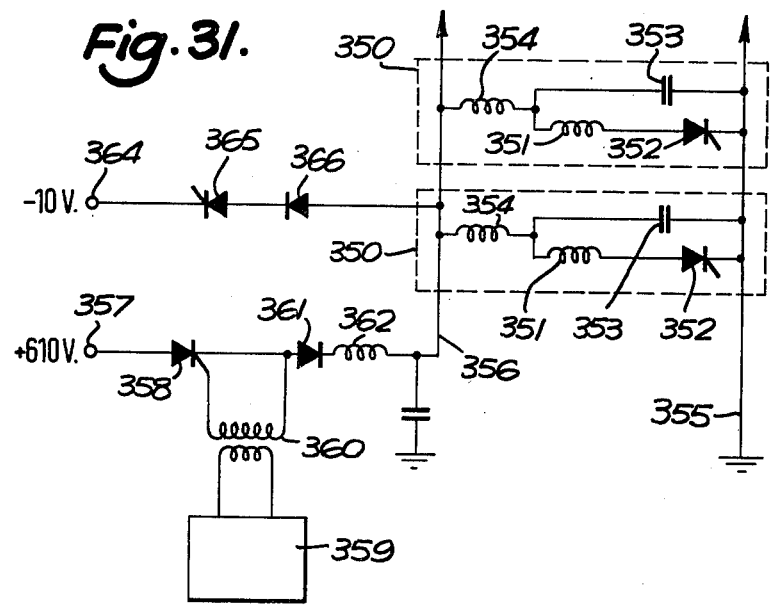

FIG. 31 illustrates diagrammatically the manner of connecting the various sections of the tank circuit to a charging circuit. In FIG. 31 there are shown two sections 350 of the 384 parallel connected sections. Each of these sections comprises a single turn coil 351 with its associated capacitor 353 and triggerable switch 352 together with a choke coil 354, typically of 1 mH, to protect the charging circuit from the radio frequency oscillations. The 384 units are connected in parallel between earth at 355 and a D.C. charging line 356. A resonant charging circuit is used as described previously comprising a D.C. power supply terminal 357 having, in this case, a positive voltage with respect to earth of 610 volts, the charging circuit including a thyristor switch 358 triggered by a pulse from a trigger circuit 359 via a transformer 360, a diode 361 in series with the thyristor to prevent the possibility of reverse current or breakdown in the thyristor and an air cored charging inductance 362 to determine the resonant charging period.

In this particular case, the coupling coefficient of 10% between the tank circuit and antenna circuit will result in an antenna pulse having a maximum amplitude at the fifth cycle. The damping is then introduced as previously described to reduce the ringing time. If the damping does not reduce the r.f. ringing to a low enough amplitude to open all the thyristors at the time that the charging of the capacitors is to start again, the charging output will be shorted and the complete breakdown will occur. To guard against this a reverse voltage charging is applied to the tank circuit to ensure that the thyristor switches 352 are opened. This reverse voltage is provided from a minus 10 volt supply terminal 364 via a triggerable switch 365 and diode 366.

Figure 32:
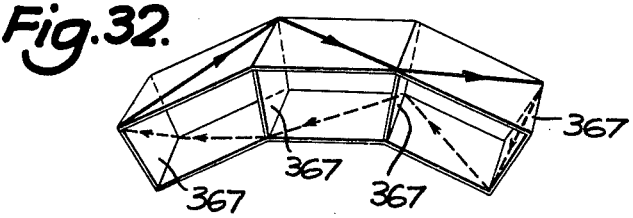
FIG. 32 illustrates a modification of a coil section used in the arrangement of FIG. 25.

The hexagonal shape of the coil assembly of FIGS. 25 to 28 has some disadvantages over one having a more circular shape and it may therefore be preferred to modify the hexagonal segment, for example as shown in FIG. 32, which shows a former for one section of the primary winding assembly in which the centres of the four plates 367 forming the radial parts of the coil supports are not aligned on a straight line but are on a circular arc, and the inner and outer surfaces of the former are constituted each by three flat plates.

Figure 33:
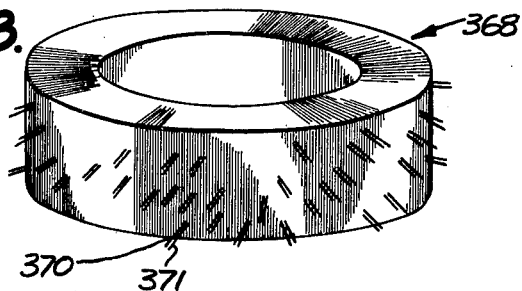
FIGS. 33 and 34 are diagrams illustrating another form of coil assembly.
Figure 34:
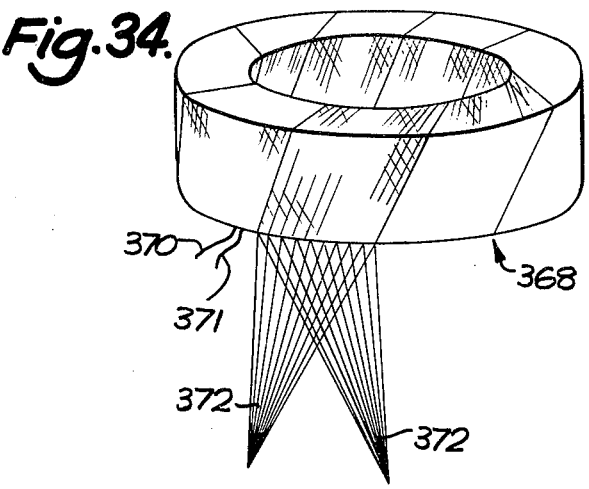

FIGS. 33 and 34 illustrate another method of forming a coil assembly 368 using a toroidal former. The former has 384 coils each of two turns wound on it to form 384 sections of a primary winding. Each of these coil sections typically has an inductance of 0.3 mH. As shown in FIG. 33, the two ends (as for example ends 370, 371) of each coil section are close together and are taken radially outwardly for connection to the associated capacitance and triggerable switch. The secondary winding comprises eight turns of ten wires 372 in parallel as shown in FIG. 34. The connections for the primary windings protrude between the turns of the secondary winding. The windings may be enclosed in a shield with the connections taken through the shield as in the previously described embodiments.

Figure 35:
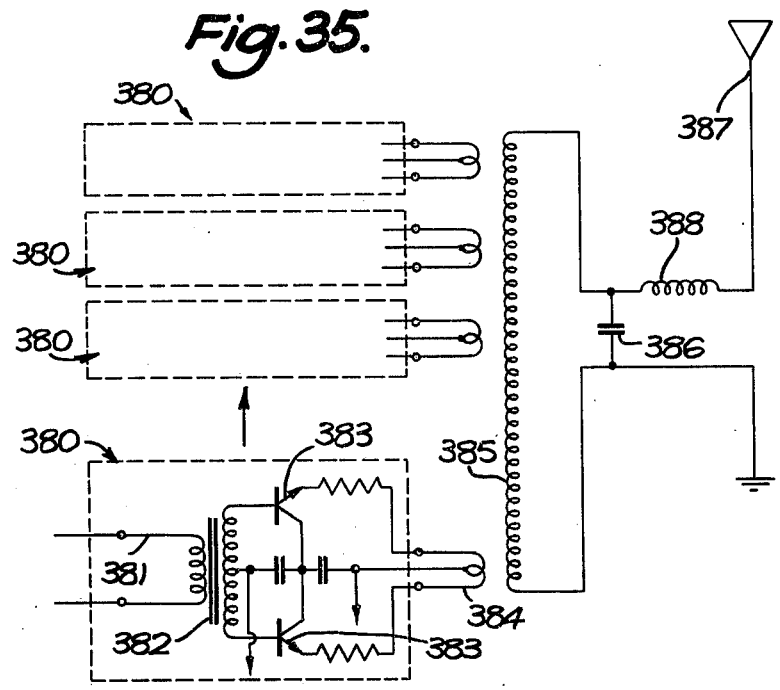
FIG. 35 illustrates a power amplifier and antenna circuit for a continuous wave radio frequency transmitter.

The invention has been more particularly described with reference to a pulse generator. The coil construction however can also advantageously be employed in a solid state continuous wave power amplifier, for example for use in a C.W. phase comparison navigation system. Thyristors provide an excellent switch for closing a primary oscillatory discharge circuit but, for a solid state power amplifier, transistors would preferably be used with drive circuitry which may be of known form. The above-described coil construction however provides an excellent means of effectively paralleling a large number of transistors. In such a power amplifier a large part of the primary tuning capacitance may be coupled to a single winding having as close a coupling as possible to the multi-unit primary inductance. Such a further winding tightly coupled to the primary windings has been described with reference to FIG. 21. FIG. 35 illustrates a C.W. power amplifier and associated antenna circuit. Referring to that figure, there are a plurality of radio frequency power amplifier units 380, each driven at the required radio requency at input terminals 381 which are coupled by a transformer 382. to a push-pull amplifier comprising two transistors 383 driving an output winding 384. These windings 384 together form the primary inductance unit. Tightly coupled to this inductance unit is an auxiliary winding 385 with a tuning campacitor 386 which constitutes a large part of the primary tuning capacitance so forming a circuit tuned to the required radio frequency. The antenna circuit is series tuned and comprises essentially an antenna 387 and secondary winding 388 coupled to the primary inductance.

I claim:

1. A radio frequency power output device comprising a primary inductance unit including a coil formed of a plurality of similar adjacent windings inductively coupled to constitute a single primary inductance unit, a plurality of solid state current control units, means connecting each control unit directly to the ends of a respective associated winding, the current control units being located adjacent the respective windings with said connecting means disposed in pairs adjacent one another to cancel the fluxes produced by the currents in said connecting means, timing means arranged for operating said current control units simultaneously, capacitor means coupled to each of said adjacent windings by a respective current control unit to make said primary inductance unit resonant at a predetermined frequency when the control units are conductive, and a radio frequency power output circuit including a secondary winding coupled to all the windings of said primary inductance unit and tuned to said predetermined frequency.

2. A radio frequency power output device as claimed in claim 1 wherein said coil is of toroidal construction.

3. A radio frequency power output device as claimed in claim 1 wherein said coil has a conductive shield, the solid state control units being outside the shield with each unit having adjacent radial end connections passing through the shield.

4. A radio frequency power output device as claimed in claim 3 wherein each primary winding has the same number of turns.

5. A radio frequency power output device as claimed in claim 3 wherein the shield comprises an outer peripheral face and at least one closed end face.

6. A radio frequency power output device as claimed in claim 2 wherein said coil comprises a plurality of primary windings, each of one or more turns and each having the same number of turns, the primary windings being wound uniformly on a former with the end connections of each winding being close together, and the individual primary windings with their end connections being evenly spaced around the toroid.

7. A radio frequency power output device as claimed in claim 6 wherein said end connections are on the inner peripheral face of the toroid.

8. A radio frequency power output device as claimed in claim 6 wherein said end connections are on the outer peripheral face of the toroid.

9. A radio frequency power output device as claimed in claim 3 whierein each pair of end connections are connected to an associated capacitor as well as to the associated solid state current control unit so that each winding forms a separate tank circuit section.

10. A radio frequency power output device as claimed in claim 1 and having a further winding closely coupled to said primary inductance unit with capacitance means connected in circuit with said further winding whereby the primary inductance unit with its associated winding is resonant at a predetermined frequency.

11. A radio frequency power output device as claimed in claim 1 wherein the primary and secondary windings are wound on separate formers.

12. A radio frequency power output device as claimed in claim 11 wherein the primary windings are wound on a plurality of formers which fit together to form a toroid.

13. A radio frequency power output device as claimed in claim 12 wherein said coil comprises a cylindrical former having the secondary winding wound around the cylindrical former, a cylindrical shield of conductive material around the secondary winding and, within the shield, a plurality of further formers each carrying a winding or windings of a primary inductance unit, said further formers being disposed adjacent the secondary winding in positions such that each section of the primary winding is linked only to the flux of the secondary winding in a limited arcuate region but said sections being disposed uniformly around the axis of the assembly.

14. A radio frequency power output device as claimed in claim 13 wherein the primary windings are disposed between the periphery of the secondary winding and the shield.

15. A radio frequency power output device as claimed in claim 14 and having end connections for each primary winding passing through holes in the shield.

16. A radio frequency power output device as claimed in claim 1 and having an air gap between the primary and secondary windings.

17. A radio frequency power output device as claimed in claim 1 wherein a second primary inductance unit is provided, both primary inductance units being coupled to said secondary winding, the two primary inductance units being arranged one on each side of the secondary winding to be inductively coupled thereto.

18. A radio frequency power output device as claimed in claim 17 wherein the two primary inductance units are coupled in opposite phase to said secondary winding.

19. A radio frequency power output device as claimed in claim 18 and having means for alternately firing the switches associated with one and the other primary inductance units to give alternate pulses with phase reversal.

20. A radio frequency power output device as claimed in claim 1 and having a single primary inductance unit comprising a plurality of windings each with its associated capacitor and wherein a second charging circuit is provided, the two charging circuits being arranged one for charging the capacitors to one polarity and the other for charging the capacitors to the opposite polarity with means for selectively operating one or other charging circuit according to the required polarity of the pulse to be radiated.

21. A radio frequency power output device as claimed in claim 20 wherein the solid state current control units for each primary winding comprise two thyristors arranged with opposite polarities and means for selectively triggering one or other of the thyristors in accordance with the polarity of the charge on the capacitor, the other thyristor being fired half a cycle at the radio frequency later.

22. A radio frequency pulse generator comprising a primary circuit tuned to a given frequency and having a plurality of units forming a multiplex primary, each unit including a winding connected in series with a primary capacitor and a solid state switch; a tuned secondary circuit coupled to said multiplex primary and tuned to said given frequency; and operating means connected to said solid state switches arranged to operate said switches simultaneously to discharge each of said primary capacitors through the associated solid state switch to product an oscillatory current in the primary circuit and hence in the secondary circuit.

23. A radio frequency pulse generator as claimed in claim 22 and having a resistance and a further solid state switch connected in shunt with said primary circuit to shunt the circuit with said resistance when the switch is closed and means arranged to operate said further switch is closed and means arranged to operate said further switch at the time of or later than the time of peak secondary current.

24. A radio frequency pulse generator as claimed in claim 22 and including time-controlled switching means arranged for introducing an effective shut resistance across the secondary circuit and means arranged to operate said switching means at the time of or later than the time of peak secondary current.

25. A radio frequency pulse generator as claimed in claim 22 and having time-controlled switching means with at least one resistive impedance arranged to be electrically introduced into the secondary circuit by said switching means to substatially increase the series resistance of the secondary circuit at a time later than the time of peak secondary current.

26. A radio frequency pulse generator as claimed in claim 22 and having a charging circuit including a series inductance and switch arranged for charging said primary capacitors.

27. A radio frequency pulse generator as claimed in claim 22 and having a single charging circuit for charging all of said primary capacitors.

28. A radio frequency pulse generator as claimed in claim 26 wherein said charging circuit comprises a D.C. supply source and a low frequency resonant circuit including means to block reverse current flow.

29. A radio frequency pulse generator as claimed in claim 28 wherein the charging circuit includes a thyristor as switching means for controlling the timing of initiation of charging.

30. A radio frequency pulse generator as claimed in claim 22 and having oscillation damping means for each unit of said multiplex primary and for said tuned secondary circuit together with trigger-controlled switch means arranged for switching the damping means into circuit after the peak oscillation in the secondary circuit.

31. A radio frequency pulse generator as claimed in claim 30 wherein said damping means comprises inductively coupled damping circuits.

32. A radio frequency power output device comprising a primary inductance unit comprising a plurality of coupled primary windings, a plurality of capacitors each associated respectively with a primary winding, a plurality of switch means connected to said capacitors and primary windings and operative to connect each capacitor and its associated winding together to form a resonant circuit, means for charging said capacitors, a secondary circuit coupled to all of said primary windings and timing means arranged to operate said switch means simultaneously to discharge each capacitor into its associated winding and thereby produce an oscillatory discharge in each of said resonant circuits, whereby an oscillatory discharge is produced in the secondary circuit with the maximum voltage building up in successive cycles after the initial discharge of the capacitors to a maximum with a delay of a predetermined number of cycles dependent on the coupling coefficient between the primary windings and secondary circuit.

33. A radio frequency power output device as claimed in claim 32 wherein each said switch means comprises a bidirectional solid state switch.

* * * * *

UNITED STATES PATENT OFFICE
CERTIFICATE OF CORRECTION

Patent No. 4,058,742     Dated November 15, 1977

Inventor(s) William Joseph O'Brien

It is certified that error appears in the above-identified patent and that said Letters Patent are hereby corrected as shown below:

IN THE HEADING:

[30]    Foreign Application Priority Data

Sept. 7, 1973   Great Britain ------------ 42236/73
    Nov. 15, 1973   Great Britain ------------ 53062/73
    Jan. 25, 1974   Great Britain ------------  3627/74

Signed and Sealed this

Twenty-eighth Day of February 1978

[SEAL]

*Attest:*

RUTH C. MASON
*Attesting Officer*

LUTRELLE F. PARKER
*Acting Commissioner of Patents and Trademarks*